US012732466B2

(12) United States Patent
Fröhlich et al.

(10) Patent No.: US 12,732,466 B2
(45) Date of Patent: Sep. 8, 2026

(54) DYNAMIC CUSTOMIZATION OF TIME-SENSITIVE NETWORKING (TSN) WITH DIGITAL TWINS

(71) Applicant: Dell Products L.P., Round Rock, TX (US)

(72) Inventors: Herberth Birck Fröhlich, Florianópolis—SC (BR); Julia Drummond Noce, Rio de Janeiro—RJ (BR); Maira Beatriz Hernandez Moran, Rio de Janeiro—RJ (BR); Yanexis Pupo Toledo, Niterói (BR)

(73) Assignee: Dell Products L.P., Round Rock, TX (US)

( * ) Notice: Subject to any disclaimer, the term of this patent is extended or adjusted under 35 U.S.C. 154(b) by 347 days.

(21) Appl. No.: 18/495,437

(22) Filed: Oct. 26, 2023

(65) Prior Publication Data

US 2025/0141807 A1 May 1, 2025

(51) Int. Cl.
*H04L 47/2425* (2022.01)
*H04L 41/16* (2022.01)
*H04L 47/62* (2022.01)

(52) U.S. Cl.
CPC .......... *H04L 47/2433* (2013.01); *H04L 41/16* (2013.01); *H04L 47/6215* (2013.01)

(58) Field of Classification Search
CPC .. H04L 47/2433; H04L 41/16; H04L 47/6215
See application file for complete search history.

(56) References Cited

U.S. PATENT DOCUMENTS

| | | | | |
|---|---|---|---|---|
| 11,985,074 | B1 * | 5/2024 | Freund | H04L 47/822 |
| 12,592,890 | B1 * | 3/2026 | Soundappan | H04L 47/125 |
| 2018/0302330 | A1 * | 10/2018 | Bush | H04L 47/27 |
| 2021/0067417 | A1 * | 3/2021 | DeLay | G06N 3/006 |
| 2022/0417160 | A1 * | 12/2022 | Gogolev | H04L 47/127 |
| 2024/0064105 | A1 * | 2/2024 | Sharma | H04L 47/2416 |
| 2025/0203601 | A1 * | 6/2025 | Bush | H04L 47/2416 |
| 2025/0379786 | A1 * | 12/2025 | Takano | H04L 41/0823 |

OTHER PUBLICATIONS

Y. Seol, D. Hyeon, J. Min, M. Kim and J. Paek, "Timely Survey of Time-Sensitive Networking: Past and Future Directions," in IEEE Access, vol. 9, pp. 142506-142527, 2021, doi: 10.1109/ACCESS.2021.3120769.

* cited by examiner

*Primary Examiner* — Jeffrey M Rutkowski
(74) *Attorney, Agent, or Firm* — Workman Nydegger

(57) ABSTRACT

One example method includes accessing at a Time-Aware Scheduler (TAS) of a Time-Sensitive Networking (TSN) network a plurality of data packets, where each data packet includes a data packet priority that defines an order for transmitting the plurality of data packets by the TSN network; grouping the plurality of data packets into a cluster according to the data packet priorities, the cluster identifying a first TSN network state; applying a first machine-learning model to the cluster to determine a TAS cycle policy that defines a timing schedule for data packet transmission in the TSN network; and providing the TAS cycle policy to components of the TSN network.

20 Claims, 10 Drawing Sheets

States
602

DYNAMIC CUSTOMIZATION OF TIME-SENSITIVE NETWORKING (TSN) WITH DIGITAL TWINS

FIELD OF THE INVENTION

Embodiments of the present invention generally relate to Time-Sensitive Networking (TSN). More particularly, at least some embodiments of the invention relate to systems, hardware, software, computer-readable media, and methods for dynamic customization of TSN with digital twins.

BACKGROUND

Time-Sensitive Networking (TSN) is a set of protocols and technologies that help the network handle time-sensitive applications, such as online games, smart cities, autonomous vehicle control systems, among others. TSN is a Quality-Of-Service (QOS) guarantee approach with reliable and secure packet delivery. TSN customization involves adapting or optimizing the configurations and functionalities of a TSN network to meet the specific needs of applications or systems. This may include tweaking the time multiplexing configuration, QoS, bandwidth allocation, and other network aspects.

To work correctly, TSN network devices must adjust their settings according to the applications and devices connected to it. Given the great heterogeneity inherited by Internet-Of-Things (IoT) technologies, device configurations cannot be static, they must be dynamically optimized according to the devices, applications and QoS requirements of each one, which can vary from one network to another or in the same network when a device/service goes in or out of operation, as different devices may have different requirements and configurations, and the demand for network resources can change rapidly in these environments.

Time-Aware Scheduler is a technology used in TSN networks to ensure reliable and predictable delivery of data packets. It works by monitoring and adjusting the packet transmission time, according to the time-critical requirements of each application. But some challenges prevent its effectiveness and scalability, such as its complexity and interoperability in heterogeneous and large-scale networks. Adjustment of settings does not happen dynamically or automatically adjusts to new network operating conditions, such as new time-sensitive applications, or congestion problems, etc.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
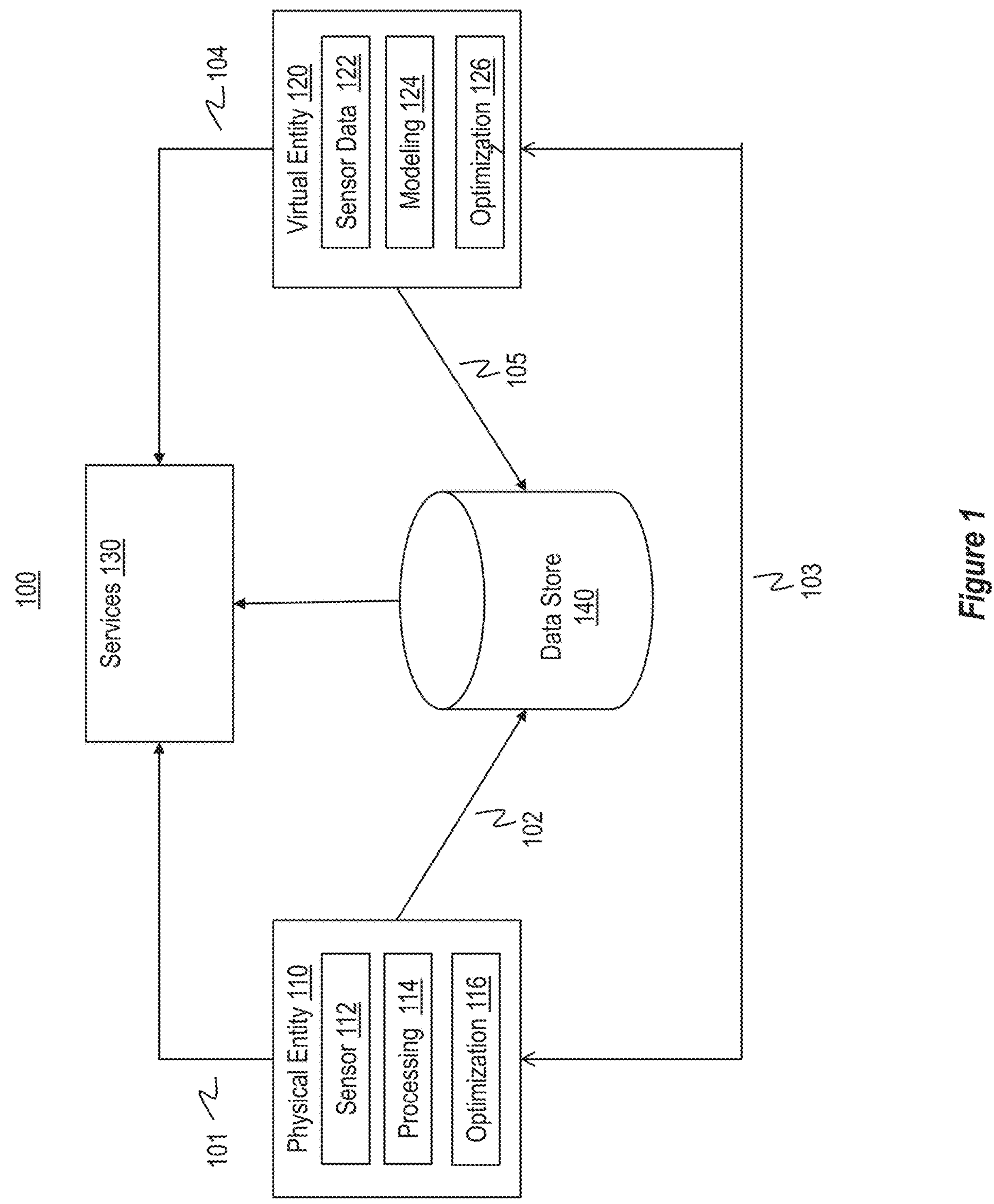
FIG. 1 discloses aspects of a digital twin network according to the embodiments disclosed herein.

Embodiments of the present invention generally relate to Time-Sensitive Networking (TSN). More particularly, at least some embodiments of the invention relate to systems, hardware, software, computer-readable media, and methods for dynamic customization of TSN with digital twins.

In general, example embodiments of the invention are related to the dynamic customization of the Time-Aware Scheduler (TAS) in TSN networks. Such dynamic customization allows network scheduling to be adjusted in real time according to the needs of the applications and the network environment. This is accomplished through digital twins, which are virtual models of network devices that can be used to monitor and control their settings in real time. This dynamic customization allows the TSN network to automatically respond to changes in workloads or network issues, adjusting packet prioritization to ensure reliable and predictable data delivery.

In addition, it is also possible to adjust the scheduling policy according to the relative importance of the applications and transmitted data, modeled in the digital twin, allowing the network to offer a superior and more reliable performance. In the embodiments, the digital twin receives information on the current network state and adjusts the allocation of slots in the TAS cycle from clusters of Reinforcement Learning (RL) models suitable for each traffic flow. To train the RL models, different network states are created by simulating different network traffic of priority and non-priority packets, as well as their QoS requirements. Each RL cluster learns to optimally allocate data slots in the TAS, for a specific network condition, ensuring that the TSN network can handle dynamic QoS requirements, necessary when the TSN network suffers from congestion or is exposed to new time sensitive applications.

The embodiments disclosed herein provide the at least the following novel aspects:

1. Dynamic customization of the TAS based on a method that recognizes in real time the different network operation states and groups data packets into clusters according to the QoS requirements of the data packets of each class.
2. Self-configuration of the network TAS with RL algorithms trained in a virtual environment with digital twins.

One example method includes accessing at a Time-Aware Scheduler (TAS) of a Time-Sensitive Networking (TSN) network a plurality of data packets, where each data packet includes a data packet priority that defines an order for transmitting the plurality of data packets by the TSN network; grouping the plurality of data packets into a cluster according to the data packet priorities, the cluster identifying a first TSN network state; applying a first machine-learning model to the cluster to determine a TAS cycle policy that defines a timing schedule for data packet transmission in the TSN network; and providing the TAS cycle policy to components of the TSN network.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of a Digital Twin Framework

The embodiments disclosed herein are related to a digital twin framework. Accordingly, a short explanation of a digital twin network will now be given. In general, a digital twin is a digital representation of an intended or actual real-world physical product, system, or process that serves as the effectively indistinguishable digital counterpart of it for practical purposes, such as simulation, integration, testing, monitoring, and maintenance.

FIG. 1 illustrates an embodiment of a digital twin network 100. As illustrated, the digital twin network 100 includes a physical entity 110 and a virtual entity 120 that is a digital twin of the physical entity 110. The digital twin network 100 also includes services 130 and data store 140. The physical entity 110 is a real world device such as an AMR or a smart forklift. Accordingly, the physical entity 110 includes, but is not limited to, sensors 112 for monitoring its operational environment and its operational parameters, processing capabilities 114 that allow the physical entity to process data so that it can perform a primary task such as moving supplies in a warehouse, and optimization capabilities 116 that are used to optimize its primary task. The physical entity 110 is also able to access various services 130 as shown at 101 that it uses in the performance of its primary task and is able to access the data store 140 as shown at 102 to access data as needed.

The virtual entity 120 is able to virtually represent the physical entity 110 by maintaining a communication channel 103 with the physical entity. Accordingly, the virtual entity 120 includes sensor data 122 that includes data obtained from the sensors 112. The virtual entity also includes modeling capabilities 124 and optimization capabilities 126. The virtual entity 120 is able to use the modeling capabilities 124 and optimization capabilities 126 to model and optimize the primary task and other operational aspects of the physical entity 110 to thereby allow a user to determine optimal perforce parameters for the physical entity 110, which can then be fed back to the physical entity 110. The virtual entity 120 can also access the services 130 as shown at 104 and the data store 140 as shown at 105 so as to mirror the services and data accessed by the physical entity 110.

B. Aspects of Time-Sensitive Networking (TSN)

TSN networks (Time-sensitive Networking) are a set of Ethernet standards that provide real-time deterministic communication for time-sensitive applications such as audio, video, industrial control, and other critical applications that require ultra-low latency and high reliability. TSNs add real-time features to standard Ethernet such as time scheduling, traffic prioritization, and precise synchronization. These features allow TSN network devices to operate with low latency and ensure that critical data traffic reaches its destination within a predictable time frame.

In TSN, data packets are classified by the Traffic Classification Engine (TCE) into different classes, according to applications and network needs, each with specific QoS requirements. The most common traffic classes in TSN are Time-Sensitive (TS, Real-time traffic class), Best-Effort (BE, Best-effort traffic class) and Synchronization traffic class (Synchronization traffic class), but it supports other ratings. These classes are used to classify network packets based on specific Quality-Of-Service (QOS) requirements such as latency, guaranteed packet delivery, and accurate clock synchronization that are forwarded by a Time-Aware Scheduler.

The Time-Aware Scheduler is a fundamental component of TSN networks that oversees scheduling, in real time, traffic packets of different classes. It is responsible for determining when each data packet should be sent by devices on the TSN network, to ensure that critical data is delivered within a predictable timeframe and with low latency. The Time-Aware Scheduler uses Time-Aware Shaper (TAS) time multiplexing to ensure packets are transmitted efficiently. Time multiplexing allows multiple streams of data to share the same transmission medium, such as a switch port, so that each stream is transmitted during a certain time, establishing priorities, and respecting the order. For example, packets with more strict time requirements (class TS) are transmitted before packets with less strict time requirements (class BE).

TSN achieves low latency and fault tolerance through traffic prioritization, rationalization, shaping and policing. Traffic on TSN is classified according to requirements and configuration known a priori, and limited latency is guaranteed through appropriate shapers assigned to each class or data stream. Everything works fine in a fully prepared state, but TSN is vulnerable to unexpected runtime changes in network conditions. To compensate for this vulnerability, TSN requires a method to recognize network status changes in real time and seamlessly modify the online traffic class configuration without interrupting or pausing the system.

B.1. Aspects of Time-Aware Shaper (TAS)

TAS introduces a principle based on TDMA (Time Division Multiple Access) that allows the assignment of transmission slots to different classes of traffic. Flows are generally classified into two types, Time-Sensitive flows (TS) and Best-Effort flows (BE). TS streams are those that require accurate and reliable delivery of data over a specific time, such as real-time audio and video applications. These streams usually have a high priority and the TAS ensures that they are given the necessary bandwidth to be transmitted correctly. BE flows are those that are not time-critical and do not require reliable delivery of data within a specified time. These streams generally have a lower priority and can be streamed when bandwidth is available.

Therefore, each outgoing queue from a physical network port that supports 802.1 Qbv is preceded by a time-aware port. Ports are programmed by specifying a cycle time and gate control list. The list configures the time slices to open and close ports for each queue. Time-aware ports can open (state 1) or close (state 0) according to a cyclic schedule specified in the gate control list (GCL). Only packets located in queues with open gates are considered for transmission by the transmission switching algorithm. If multiple queues are open, transmission selection operates according to the established algorithm. In most cases, strict priority is applied.

Packet prioritization was introduced by the IEEE 802.1P task group in the 1990s. This QoS technique, also known as Class of Service (CoS), consists of a 3-bit field called Priority Code Point (PCP) within an Ethernet frame header when using VLAN tagged frames. This field lets a user specify a priority value between 0 and 7 that can be used to prioritize traffic at the MAC layer. The Ethernet switch can have one or more transmission queues for each bridge port. Each queue provides storage for frames waiting to be transmitted. Frames will be assigned to each queue according to its CoS, and the forward switching algorithm will select the next packet from the queue to be transmitted. TAS divides time into intervals called frames, and each frame is allocated to a data stream. This frame size can be adjusted so that bandwidth is flexibly and dynamically allocated as network operating conditions change.

Figures 2A, 2B:
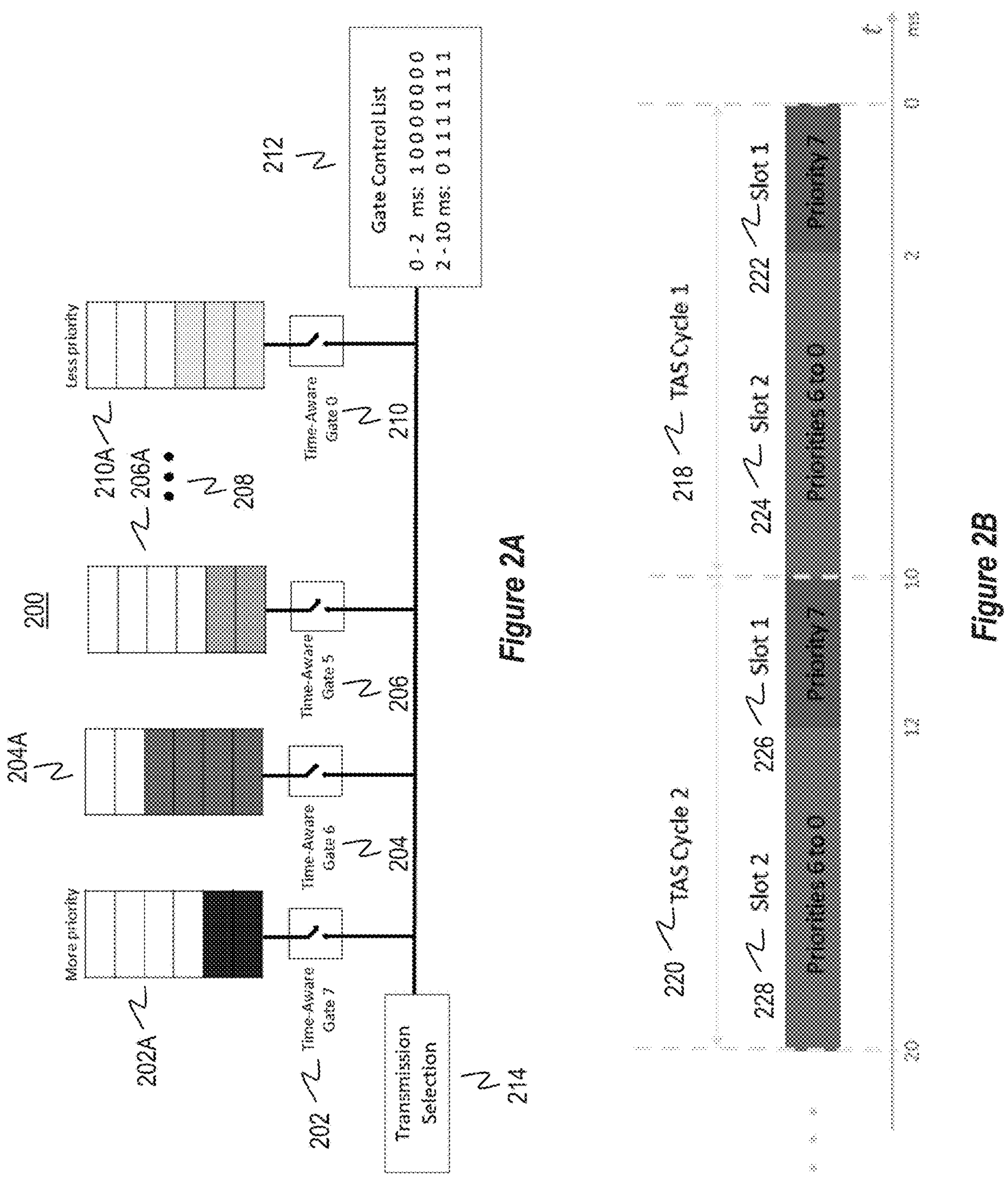
FIGS. 2A and 2B disclose aspects of a TAS according to the embodiments disclosed herein.
Figure 7:
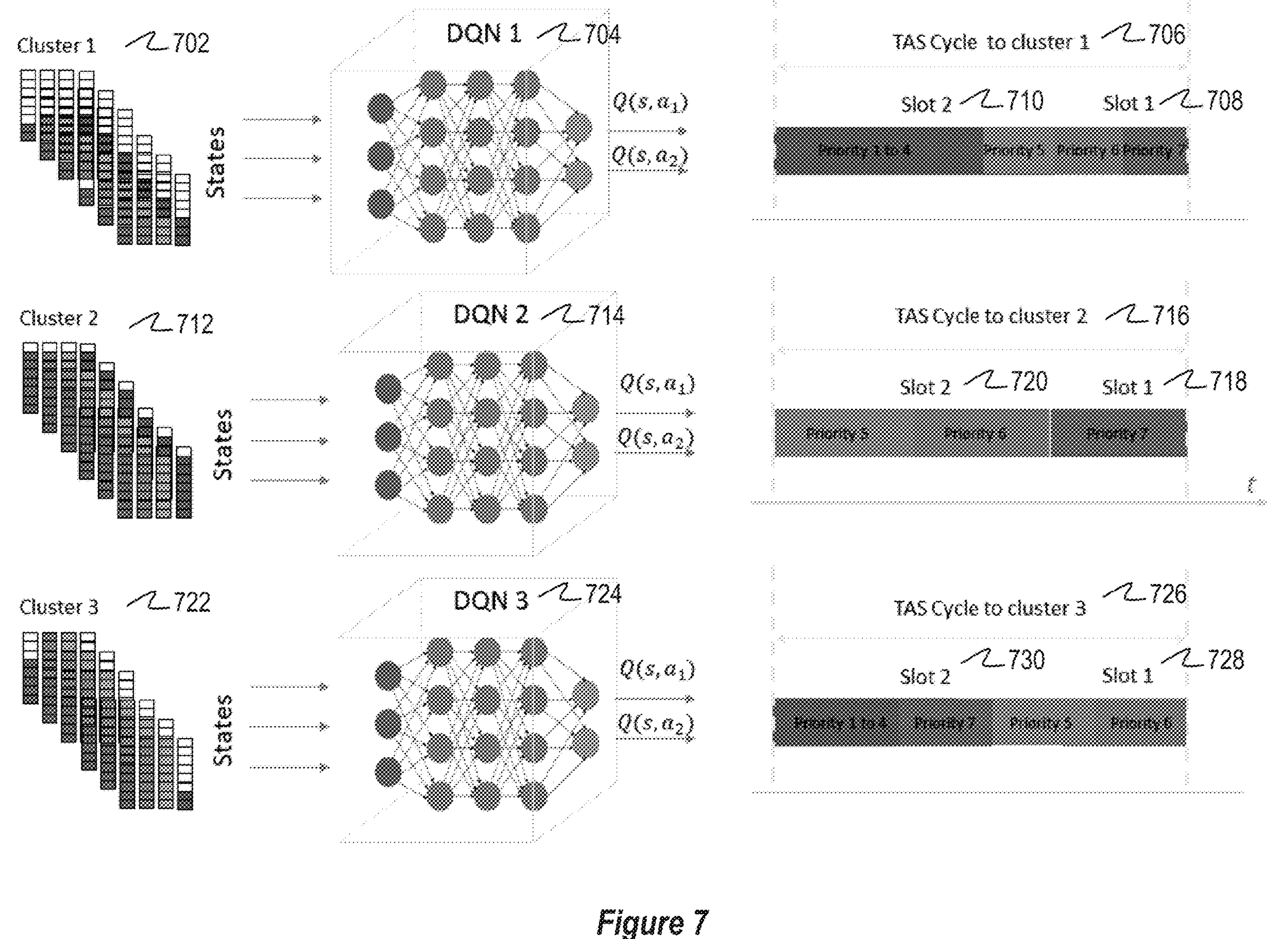
FIG. 7 discloses aspects of use cases according to the embodiments disclosed herein.

FIG. 2A illustrates an embodiment 200 of a configuration of TAS components. As shown in FIG. 2A, the embodiment includes eight time-aware gates and their associated network data queues in descending transmission priority. For example, a time-aware gate 7 202 with an associated data packet queue 202A has the highest priority, a time-aware gate 6 204 with an associated data packet queue 204A has a second highest priority, a time-aware gate 5 206 with an associated data packet queue 206A has a third highest priority, and so on to a time-aware gate 0 210 with an associated data packet queue 210A that has a lowest priority, with the ellipses 208 representing the time-aware gates 4 through 1 with their associated data packet queues in descending priority. Thus, in FIG. 2A 7 is the highest priority and 0 is the lowest priority, with the priorities going from 7 to 0 in descending priority.

As mentioned previously, time-aware ports can open with a binary state 1 or close with a binary state 0 according to a cyclic schedule specified in GCL. In FIG. 2A, critical network traffic with the highest priority is transmitted in the interval 0-2 ms while the remaining less-critical network traffic is transmitted in the interval 2-10 ms within a 10 ms TAS cycle. A GCL 212 shows a binary representation 10000000 for the highest priority time-aware gate 202 and a binary representation 01111111 for the remaining time-aware gates. Thus, each position in the binary representations represents one of the eight time-aware gates. In this example, a transmission selection policy 214 is set to strict priority and an output queue is dedicated to critical network traffic.

The resulting serialization on the transmit channel is depicted in FIG. 2B, which illustrates a TAS cycle 1 218 and a TAS cycle 2 220. The TAS cycle 1 218 is divided into a time slot 1 222 and a time slot 2 224. The time slot 1 222 has an interval of 0-2 ms and is dedicated to the data packets transmitted through time-aware gate 7, which has the highest priority. The time slot 2 224 has a time interval of 3-10 ms and is dedicated to the data packets transmitted through time-aware gates 0-6, which have a lower priority than time-aware gate 7. Thus, the data packets transmitted through time-aware gate 7 are transmitted during the first 2 ms of the TAS cycle and the remaining data packets are transmitted during the remaining 8 ms of the TAS cycle. The TAS cycle 2 220 is divided into a time slot 1 226 and a time slot 2 228 that repeat the transmission of data packets according to the priorities described for TAS cycle 1 218.

B.2. Aspects of TAS Customization

The dynamic customization of the TAS allows its reconfiguration in real time, as the needs of the application change, for example in the network congestion state, failures, or new time-sensitive applications. TSNs are configured during a single event given at startup according to applications known as a priori and generally in small networks, where any change during runtime requires manual reconfiguration. Although this is not a problem for small networks and controlled environments of a static nature, it will be noted that with the development of IoT the number of applications and devices as well as the network size is necessarily growing, where the customization of the TAS is an essential aspect to allow its integration on the Internet.

The TAS is responsible for scheduling and prioritizing data packets on the network, ensuring that critical packets are transmitted with priority and within the deadlines required by the applications. Dynamic customization is needed for at least the following two reasons: (1) when new applications are added to the network, given that each application has specific time and latency requirements that need to be addressed differently, and (2) when traffic changes such as congestion, for example, at times of peak traffic, the TAS may need to adjust its transmission rate or prioritize critical packets more heavily. Customizing the TAS is a way of compensating for the vulnerability of TSN networks in the face of unexpected changes in the network's operating condition. Customization approaches should have a method that recognizes the different states of network operation in real time and optimizes the TAS settings in each state without system interruptions.

C. Aspects of Using a Digital Twin in a TSN

Figure 3:
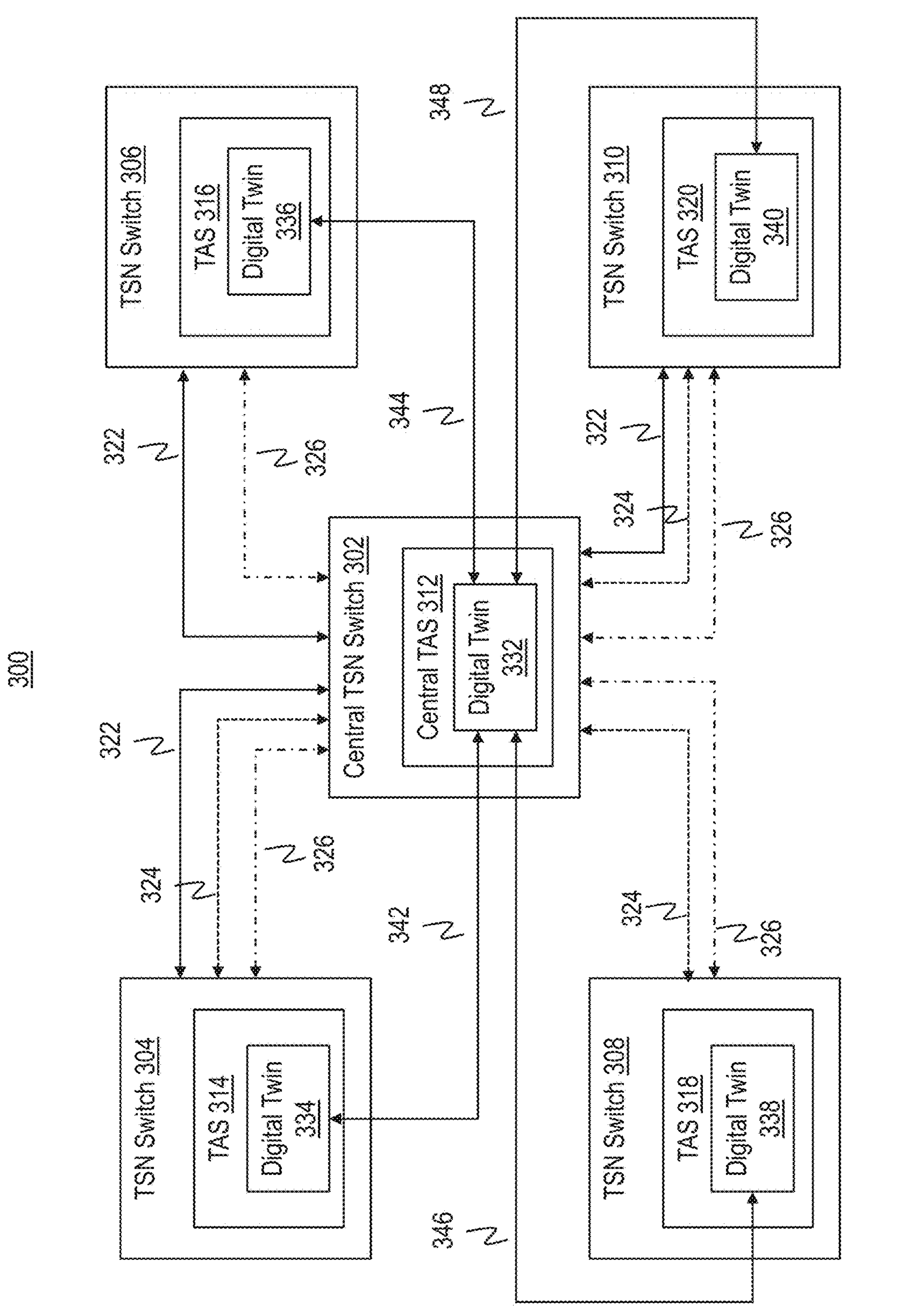
FIG. 3 discloses aspects of a TSN network according to the embodiments disclosed herein.

FIG. 3 illustrates a TSN network 300 where the embodiments disclosed herein may be practiced. As illustrates the TSN network 300 includes a central TSN switch 302 that receives network traffic data flows from a TSN switch 304, a TSN switch 306, a TSN switch 308, and a TSN switch 310. Although not illustrated, the central TSN switch 302 may receive the data flows from any number of additional TSN switches in the network. In operation, the TSN switches 304, 306, 308, and 310 receive data packets from various applications of the network and from additional non-illustrated TSN switches and then forward the data packets to the central TSN switch 302. In some embodiments, the central TSN switch 302 also receives data packets from the applications of the network.

Accordingly, each TSN switch includes a TAS. For example, the central TSN switch 302 includes a TAS 312, the TSN switch 304 includes a TAS 314, the TSN switch 306 includes a TAS 316, the TSN switch 308 includes a TAS 318, and the TSN switch 310 includes a TAS 320. The TAS of each switch forwards the data packets the central switch 302 according to the priority of the data packets.

The TSN network 300 includes data flows having three different priorities: (1) a highest priority 322 shown by the solid line, (2) a middle priority 324 shown by the small-dashed line, and (3) a lowest priority 326 shown by the large-dashed line. Thus, each TAS forwards the data packets according to their priorities. For example, the TAS 314 forwards the data packets having priority 322 first, followed next by data packets having priority 324, and finally followed by data packets having priority 326. Likewise, the TAS 320 forwards the data packets having priority 322 first, followed next by data packets having priority 324, and finally followed by data packets having priority 326. However, the TAS 316 forwards the data packets having priority 322 followed by data packets having priority 326 since there are no data packets with priority 324. The TAS 318 forwards the data packets having priority 324 first since there are no data packets with priority 322 followed by data packets having priority 326. The TAS 312 is then able to oversee data packet scheduling for central TSN switch 302 based on the priorities of the received data packets.

This forwarding of the data packets according to the priorities 322, 324, and 326 works as long as an initial configuration of the TSN network 300 does not change. However, an unexpected change, such as a change in TSN network 300 topology due to failures, traffic jam, or excessive growth of priority applications, can make TAS scheduling inefficient and require a new configuration. In conventional TSN networks, it would be necessary to manually reconfigure the TAS settings to efficiently schedule data packets according to the new network operating conditions. Such manual reconfigurations can be inefficient and costly in terms of the time it takes to perform reconfiguration process.

Advantageously, the embodiments disclosed herein implement digital twins in at least some of the TAS of the TSN switches of the TSN network 300. For example, the central TAS 312 includes a digital twin 332, the TAS 314 includes a digital twin 334, the TAS 316 includes a digital twin 336, the TAS 318 includes a digital twin 338, and the TAS 320 includes a digital twin 340. It will be appreciated that each digital twin represents the physical TAS and thus functions as a virtual TAS. Thus, digital twin 332 represents the central TAS 312, the digital twin 334 represents the TAS 314, the digital twin 336 represents the TAS 316, the digital twin 338 represents the TAS 318, and the digital twin 340 represents the TAS 320. Although each TSN switch is shown as implementing a digital twin, this need not always be the case and in some embodiments only the central TSN switch may implement the digital twin or only the central TSN switch and some subset of the TSN switches 304, 306, 308, and 310.

The digital twins are interconnected to each other in the same way that the TSN switches are connected to each other. Thus, the digital twin 332 is connected to the digital twin 334 as shown at 342, is connected to the digital twin 336 as shown at 344, is connected to the digital twin 338 as shown at 346, and is connected to the digital twin 340 as shown at 348. Although not illustrated, the digital twins 334, 336, 338, and 340 may be able to communicate with each other or a subset of each other. The connections between the digital twins allows them to model packet forwarding behavior, determine transmission and queuing times, and efficiently determine allocation policies for critical packets and adaptable to new network operating conditions as will now be explained.

C.1. Aspects of a Digital Twin

The use of digital twins introduces intelligence into the TSN network 300 to continuously monitor and automatically update its configuration to adapt to new operating conditions. The digital twins allow real-time network monitoring status. And for the automatic update of TAS configuration, various network states are grouped by clusters that determine the TAS configuration from RL models that optimize packet scheduling for each network operation state. The digital twins together with the clusters of RL models in an inference phase work as an autonomous entity that customizes the TAS by continuously monitoring the network and extracting relevant information that will be used to modify the network configuration for each drastic state change.

During a training phase, to simulate the different network states, a simulator is used that randomly generates packets of different priorities and in different quantities, simulating congestion or the increase of new priority applications in the TSN network 300, which are two causes for TSN network instabilities. With this, a k-means algorithm is used to cluster the network states into at least three clusters, (1) a cluster that represents a default state to which the TSN network 300 was initialized, (2) a second cluster that represents a congestion state, where too many priority data packets are received, and (3) a third cluster that represents the TSN network 300 state that deals with new priority applications not contemplated during network initialization, where the packet prioritization policies need to be modified.

Figure 4A:
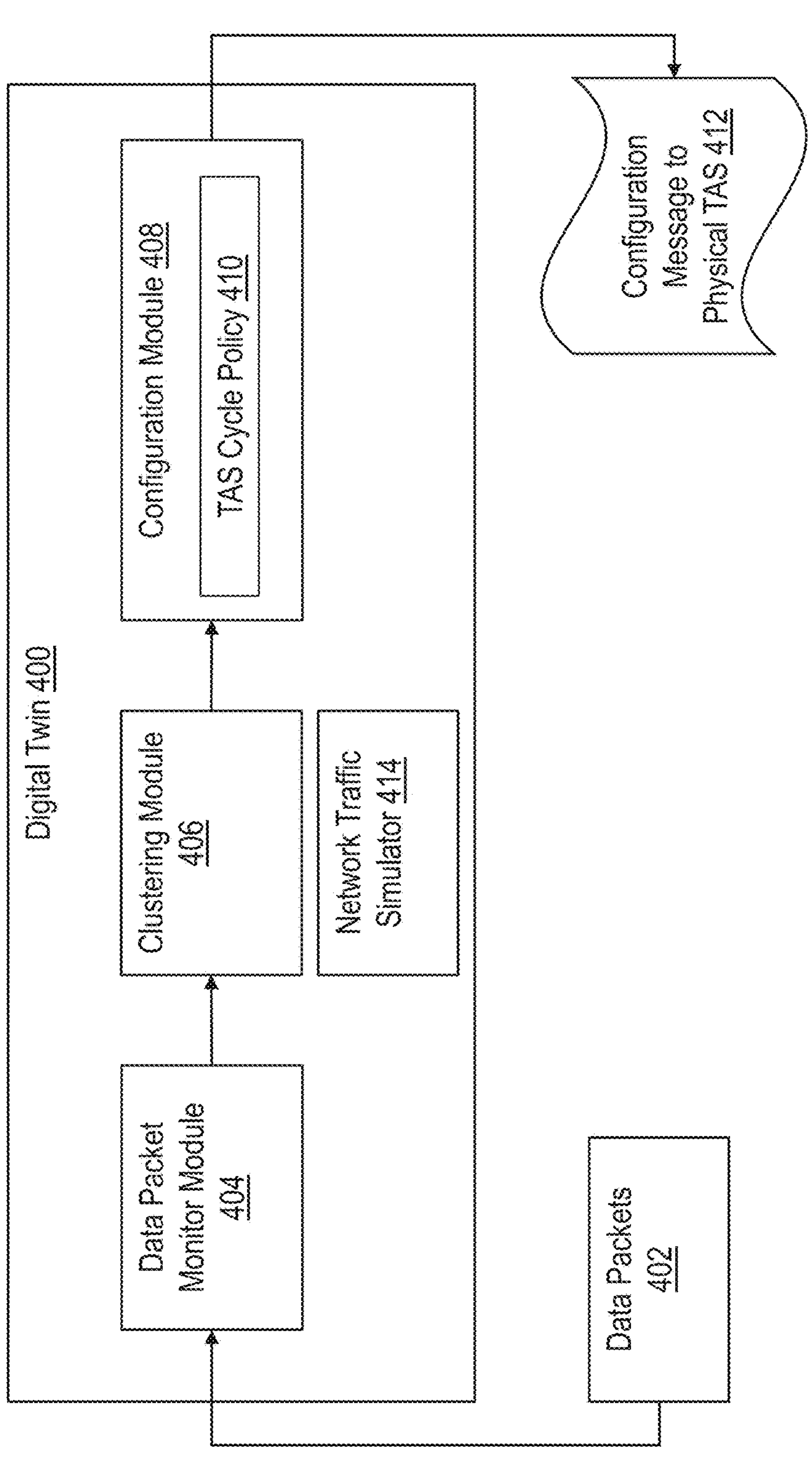
FIGS. 4A and 4B disclose aspects of a digital twin according to the embodiments disclosed herein.

FIG. 4A illustrates an embodiment of a digital twin 400, which corresponds to one or more of the digital twins 332, 334, 336, 338, and 340. The digital twin 400 receives data packets 402 of differing priorities, which may correspond to the data packets with the priorities 322, 324, and 326. The digital twin 400 includes a data packet monitor module 404. In operation, the data packet monitor module 404 collects raw network traffic data from the data packets 402, such as the number of data packets per priority class, time between message arrivals, and any other reasonable network traffic data as circumstances warrant and generates monitored data packets.

The digital twin 400 includes a clustering module 406. In operation, the clustering module 406 receives the monitored data packets from the data packet monitor module 404 and then groups the monitored data packets into one of the three clusters discussed previously based on how the data packets relate to the network states. The clustering module 406 then identifies what type of cluster the current network state corresponds to.

The digital twin 400 includes a configuration module 408. In operation, the configuration module 408 receives the current network state from the clustering module 406. The configuration module 408 then selects from a stack of trained RL models that corresponds to the current network state. The trained RL module establishes a TAS cycle policy 410 that establishes the timing schedule for the data packets in the serialized output of the data packets.

The digital twin 400 then provides a configuration message 412 to a physical TAS, such as the TAS 312, 214,316, 318, and 320, of a TSN network switch, such as the TSN switch 302, 304, 306, 308, and 310. The configuration message 412 informs the physical TAS of the TAS cycle policy that is to be applied based on the current network state. In this way, the TSN network 300 is able to dynamically adjust to changes in the network patterns as will be explained in more detail to follow.

C.2. Aspects of Training the Clustering Module

It will be appreciated that for the clustering module 406 and the RL models of the configuration module 408 to work correctly, these will need to be trained during a training phase. The training is helped by training with the greatest amount and variety of data packets possible and if the data packets possible are not available during real-time data collection during an inference phase, then they will need to be generated systematically.

Accordingly, in one embodiment a network traffic simulator 414 is included as part of the digital twin 400. In another embodiment, however, the network traffic simulator 414 may not be included as part of the digital twin 400, but may be included in another part of the TSN network 300 or a different network and may be accessible by the digital twin 400. In operation, the network traffic simulator 414 simulates different amounts and varieties of data packets that can be used to train the clustering module 406.

Figure 4B:
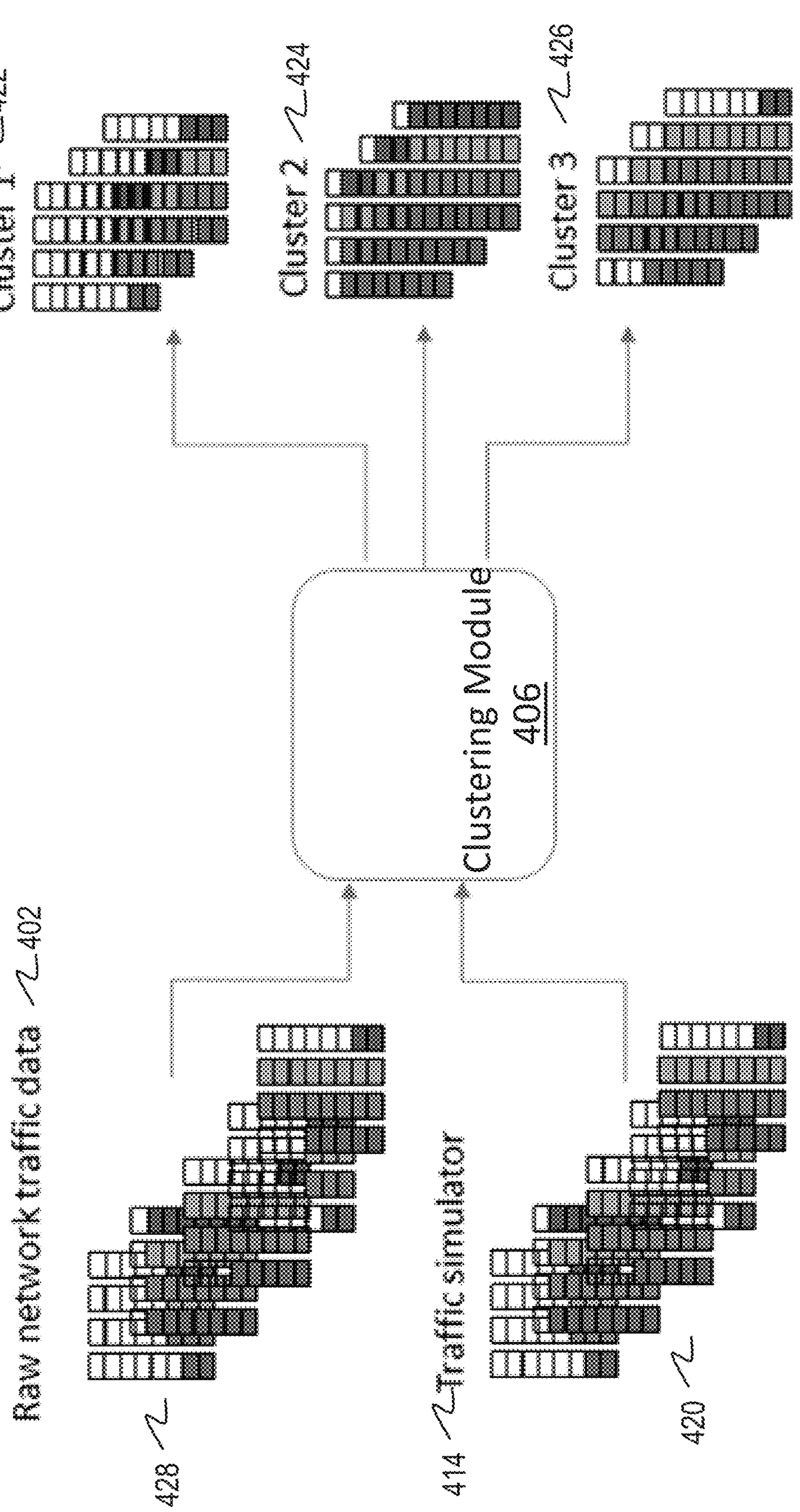

FIG. 4B illustrates an embodiment of training the clustering module 406 during a training phase and then using the cluster module during an inference phase. As will be appreciated, clustering allows grouping sets of data packets with similar characteristics. Thus, during a training phase, in one embodiment, the traffic simulator 414 simulates different amounts and varieties of simulated data packets 420. The simulated data packets 420 include different priorities as represented by the different grayscale colors in the data blocks and other data characteristics such as type of applications as represented by the overall data blocks of the simulated data packets 420.

The clustering module 406 uses the data packet priorities and other data characteristics of the simulated data packets 420, as well as the state of queues and wait times to generate different clusters of data packets that identify the different network states of the TSN network 300. For example, a cluster 1 422 corresponds to a default or normal network state that is also an initialization state. In this network state, the data packets include a normal level of different priorities, where the TSN network 300 is able to handle the data packets in the desired priority order. A cluster 2 424 corresponds to a congestion network state. In this network state, the data packets include an increased amount of data packets having higher priorities that require most or all of the TSN network resources to handle. A cluster 3 426 corresponds to a new priority network state. In this network state, the priorities of the data packets have changed so that a new highest priority is assigned and the TSN network 300 needs to be reconfigured to handle the new priority.

After the clustering engine is trained, during the inference phase, the data packet monitor module 404 monitors the data packets 402 to generate monitored data packets 428. Like the simulated data packets 420, the monitored data packets 428 include the different priorities as represented by the different grayscale colors in the data blocks and the other data characteristics such as type of applications as represented by the overall data blocks of the monitored data packets 428. The clustering module 406 can use the data packet priorities and other data characteristics of the monitored data packets 428 as well as the state of queues and wait times to generate the clusters 422, 424, and 426 of data packets that identify the different network states of the TSN network 300 as previously described.

In further embodiments, once the clustering module 406 is trained using the simulated data packets 420 during the initial training phase, the clustering module may continue to use the simulated data packets 420 and the monitored data packets 428 during the inference phase. That is, in such embodiments the continued use of the simulated data packets 420 allows for the continual updated training of the clustering module 406, which can lead to better performance of the module.

In one embodiment, a k-means algorithm is used by the clustering module 406. The k-means algorithm starts by randomly selecting three objects from any traffic feature as initial cluster centers. Then, during the training loop, the centers of the clusters are updated, assigning each cluster the most similar traffic characteristics (Euclidean distance), until the centers remain more stable. The algorithm is shown as follows:

```
Define the number of clusters k=3
Randomly select k objects from the set of traffic features
    as centroids of the k clusters
For each object in the set assign the nearest centroid
    (Euclidean distance)
do forever (centers stabilize):
    update cluster centers
    assign objects to clusters
Return the k clusters
```

C.3. Aspects of Modeling with RL Models

Figure 5:
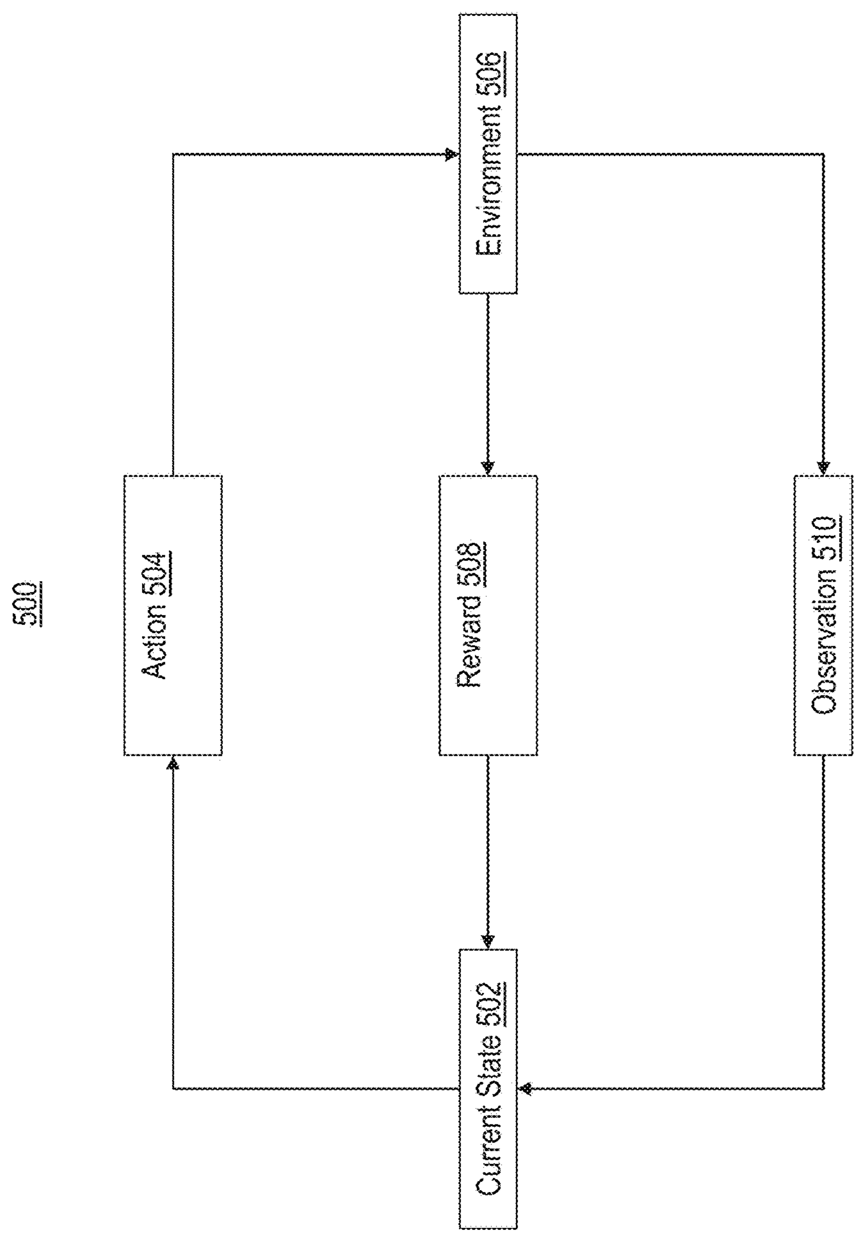
FIG. 5 discloses aspects of an RL model according to the embodiments disclosed herein.

To train the RL models used by the configuration module 408, responsible for establishing the TAS cycle policies 410, an RL model training loop 500 is established as illustrated in FIG. 5. In the RL model training loop 500 the current state 502 is given by a set of cluster characteristics that represent a network state. The current network state is represented by the network states of clusters 422, 424, and 422. The action 504 consists of serializing the different data packets and their priorities in the output of the TSN switch. Actions include allocating priorities in different ways, always looking forward to priority data packets, but in some cases managing lower priorities differently when they are the majority in the queues. Also, other possible actions consider dropping non-priority packets and adjusting the baud rate to avoid causing more congestion. The environment 506 is represented by the network state of the TSN switch at the next hop in the TSN network 300, obtained from information from its neighboring digital twins. The reward 508 is given as an objective performance measure of the data packet arrival time at the next TSN switch and the waiting time in queues at the current TSN switch and at the next TSN switch, evaluating the effectiveness of that action which is the TAS cycle policy 410 evaluated in that training step. Then, based on observations 510 the TSN network moves to the next state, from the list of characteristics provided by the cluster, and performs a new schedule.

Figure 6:
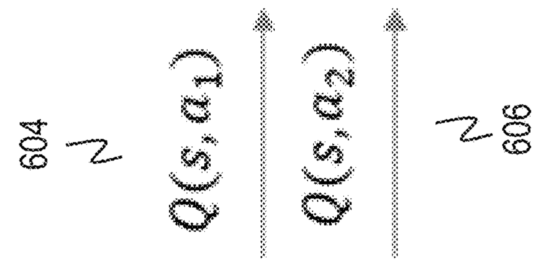
FIG. 6 discloses aspects of a Deep-Q Network according to the embodiments disclosed herein.
Figure 6:
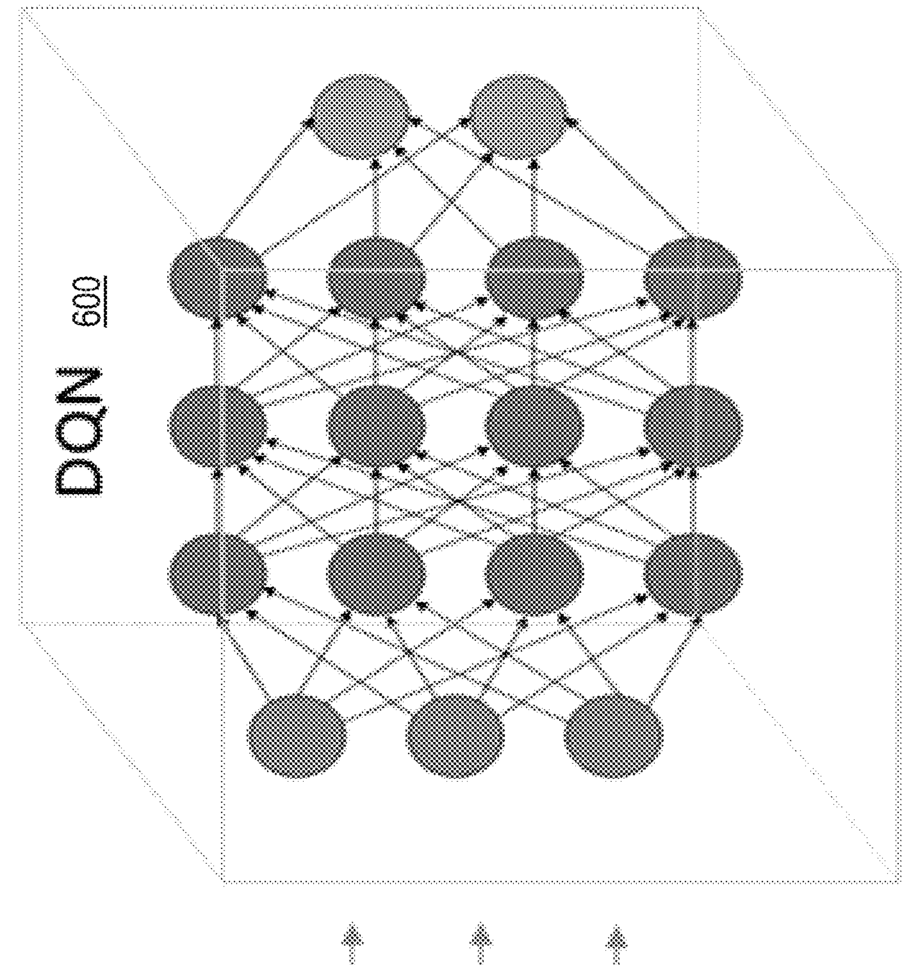

In one embodiment, as shown in FIG. 6, RL model training loop 500 is performed using a Deep Q-Network (DQN) 600. In the DQN 600, inputs 602 are represented by the current state 502 and the actions 504. These inputs are fed through the input layers, various hidden layers, and the output layer of the DQN 600 output a first Q-value function 604 and a second Q-value function 606.

The following describes an algorithm of learning the first Q-value function 604 and a second Q-value function 606 using the DQN 600, where:

s is the current state a is the current action $\alpha$ is the learning rate $\theta$ are the network weights r is the observed reward after executing action a in state s $\gamma$ is the discount factor for future rewards The algorithm is shown as follows:

Initialize the Q neural network with random weights $\theta$

Initialize the replay buffer size, the environment and current state

Set parameters $\alpha$, $\gamma$, $batch_{size}$, $target_{update_{freq}}$, $exploration_{rate}$ do forever (stop criterium):

1. with probability $exploration_{rate}$ select an action $a_t$ and execute it in $s_t$
2. receive immediate reward $r(s_t, a_t)$
3. observe the new state $s_{t+1}$
4. store the experience $(s_t, a_t, r, s_{t+1})$ in the replay buffer
5. sample a batch of random experiences from de replay buffer
6. calculate the Q network loss using the Bellman equation and Mean Squared Error for the batch of experiences $Q_{loss}=mean(Q(s, a, \theta_t)-r+\gamma*max(Q_t(s_{t+1}, a_{t+1}, \theta_{t+1}))^2)$
7. performs the error retro-propagation to update the Q network weights
8. at each $target_{update_{freq}}$ step, update the neural network weights
9. $s_t \leftarrow s_{t+1}$ update the current state The use of the DON 600 allows the algorithm to learn the first Q-value function 604 and a second Q-value function 606 from high-dimensional inputs, which is useful in the embodiments disclosed herein, where the states and actions are too large to be represented in a table. Furthermore, the DQN 600 uses replay buffering and exploitation techniques more efficiently. In further embodiments, other RL algorithms also be uses, especially in dynamic and high-dimensional environments such as Actor-critical, Deep Deterministic Policy Gradient (DDPG), Proximal Policy Optimization (PPO) and Trust Region Policy Optimization (TRPO).

C.3. Use Cases

As previously described, The digital twin 400 monitors and collects raw network traffic data, such as message interarrival times. The clustering module 406 learns to divide the collected data into clusters based on the network state. The training of the clustering module 406 uses the network traffic simulator 414 that replicates traffic data in the digital twin that characterizes real situations of congestion or types of excessive traffic with different priorities. The clustered data is used to train the three RL models, one for each network state. Thus, when the TSN switch is in a current network state that is different from the network state determined by the real-time monitoring, the TSN switch will detect the network state change and select the appropriate TAS cycle policy 410 for that network state. For example, in case there are a larger number of TS type data flows, the digital twin 400 can help configure the TAS in such a way that it allows adjusting the adequate bandwidth for each type of data flow, whenever the digital twin 400 detects a change of the network state. This allows the TSN network 300 to be highly scalable and adaptable to different workloads without the need for manual interference. Once the timing schedule is updated in the central TSN switch 302, it is sent as a configuration message to the TSN switches 304, 306, 308, and 310 and any other TSN switches of the TSN network 300.

FIG. 7 illustrates the operation of the digital twin 400 when it detects a change in the current network state. For example, suppose that the TSN network 300 is operating in an initial configuration that is determined by evaluating the applications initially supported by the network and the physical capabilities of the network. Further suppose that the clustering module 406 has already been trained in the manner previously described. Finally, suppose that the data packets have a priority value between 0 and 7, with 7 being the highest priority as previously described.

Thus, the clustering module 406 groups the monitored data packets into a cluster 1 702 that corresponds to the corresponds the cluster 1 422. Since the TSN network 300 is operating in the initial configuration, the cluster 1 702 corresponds to the default, normal, or initial current state. A DQN 1 704 is used to train the RL model for the default current state. Based on the RL model, the configuration module 408 selects a TAS cycle 706 as the TAS cycle policy 410. In the default network state, there are some TS data packets, lesser priority data packers and BE data packets. Accordingly, the TAS cycle 706 includes a slot 1 708 where the TS data packets having the highest priority, which is priority 7, is transmitted. The TAS cycle also includes a slot 2 710, where the lesser priority packets having priorities 6 and 5 and the BE packets having even lower priority are transmitted. The TAS cycle 706 can be sent to all the TAS in the TSN network 300.

During operation, the monitoring module 404 provides the monitored data packets to the clustering module 406, where the clustering module 406 groups the data packets into a cluster 2 712 that corresponds to the cluster 2 424, which is the cluster for a congestion current network state. A DQN 2 714 is used to train the RL model for the congestion current network state. Based on the RL model, the configuration module 408 selects a TAS cycle 716 as the TAS cycle policy 410. In the congestion network state, there is a large amount of TS data packets, in addition to the other data packets, which is the cause of the network congestion. Accordingly, the TAS cycle 716 includes a slot 1 718 where the TS data packets having the highest priority, which is priority 7, is transmitted. The TAS cycle also includes a slot 2 720, where the lesser priority packets having priorities 6 and 5 are transmitted. In the TAS cycle 716, the non-priority data packets have been dropped. Thus, the newly determined congestion network state does not match the current default network state. In response, the TAS cycle 716 can be sent to all the TAS in the TSN network 300 so that they can update data packet scheduling based on the new congestion current network state.

During further operation, the monitoring module 404 provides the further monitored data packets to the clustering module 406, where the clustering module 406 groups the data packets into a cluster 3 722 that corresponds to the cluster 3 426, which is the cluster for a new priority current network state. A DQN 3 724 is used to train the RL model for the new priority current network state. Based on the RL model, the configuration module 408 selects a TAS cycle 726 as the TAS cycle policy 410. In the new priority network state, there is a new highest priority, which in the embodiment is priority 6 that has replaced priority 7. Accordingly, the TAS cycle 726 includes a slot 1 728 where the TS data packets having the highest priority, which is now priority 6, is transmitted. The TAS cycle also includes a slot 2 730, where the lesser priority packets having priorities 5 and 7 are transmitted. Thus, the newly determined new priority network state does not match the current congestion network state. In response, the TAS cycle 726 can be sent to all the TAS in the TSN network 300 so that they can update data packet scheduling based on the new priority current network state.

The TAS of each TSN switch divides the TAS cycle into time slots to schedule and prioritize the transmission of the data packets. Each time slot can be reserved for a specific application or for a group of applications, depending on the needs of the applications and the network state. In some applications, the TAS cycles are set to the same time (cluster 1) and the TAS uses this fixed interval to schedule data prioritization. But the TAS cycles can be timed, dynamically adjusting the timing as needed, enabling better bandwidth utilization, better serving different workloads, and reacting in real time to network outages and congestion. The number of time slots for each type of data flow, the grouping of applications per time slot and the time of each TAS cycle can be dynamically adjusted to ensure greater adaptability of TSN networks to heterogeneous environments without the need for manual reconfiguration. Digital twins are an excellent enabling technology in this environment, as they allow the monitoring of network devices in real time and thus know the critical time needs of each application and the network current state. Digital twins can integrate network management information and, together with machine learning algorithms, make decisions on how to adjust TAS settings to improve network performance and ensure compliance with QoS policies in heterogeneous environments.

In some embodiments, a digital twin will need enough memory and computational capacity to store large volumes of data and continuously train clusters and RL algorithms. Accordingly in such embodiments to help preserve network resources, only the central digital twin (e.g., digital twin 332) oversees customizing the configuration of the output ports of the TSN switch, while the other neighboring digital twins help the central digital twin in updating the state of its neighbors to determine the state of the TSN switches in the next hop on the TSN network 300.

D. Example Methods

Figure 8:
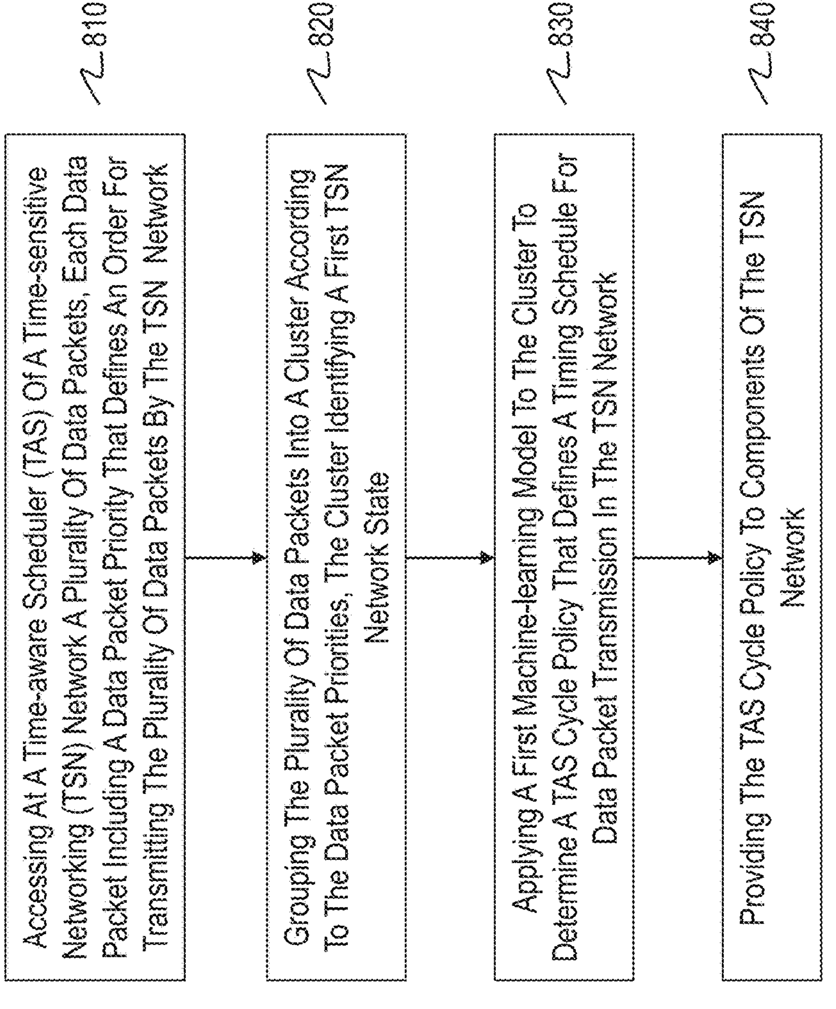
FIG. 8 discloses aspects of a method according to the embodiments disclosed herein.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 800 is disclosed. The method 800 will be described in relation to one or more of the figures previously described, although the method 800 is not limited to any particular embodiment.

The method 800 includes accessing at a Time-Aware Scheduler (TAS) of a Time-Sensitive Networking (TSN) network a plurality of data packets, each data packet including a data packet priority that defines an order for transmitting the plurality of data packets by the TSN network (810). For example, as previously described the digital twin 332 of the Central TAS 312 access the simulated data packets 420 and/or the monitored data packets 428 that each have a priority that defines an order of transmission. As explained, in one embodiment the priority may be from a priority 7 through a priority 0 in descending priority.

The method 800 includes grouping the plurality of data packets into a cluster according to the data packet priorities, the cluster identifying a first TSN network state (820). For example, as previously described clustering module 406 groups the simulated data packets 420 and/or the monitored data packets 428 into a cluster 1 422 identifying a default state, a cluster 2 424 identifying a congestion state, or a cluster 3 426 identifying a new priority state.

The method 800 includes applying a first machine-learning model to the cluster to determine a TAS cycle policy that defines a timing schedule for data packet transmission in the TSN network (830). For example, as previously described the configuration module 408 uses the trained RL models to determine the TAS cycle policy 410 that defines the timing schedule for the data packet transmission in the TSN network 300.

The method 800 includes providing the TAS cycle policy to components of the TSN network (840). For example, as previously described configuration message 412 is provided to the various TAS of the TSN switches of the TSN network 300.

E. Further Example Embodiments

Following are some further example embodiments of the invention. These are presented only by way of example and are not intended to limit the scope of the invention in any way.

Embodiment 1. A method, comprising: accessing at a Time-Aware Scheduler (TAS) of a Time-Sensitive Networking (TSN) network a plurality of data packets, each data packet including a data packet priority that defines an order for transmitting the plurality of data packets by the TSN network; grouping the plurality of data packets into a cluster according to the data packet priorities, the cluster identifying a first TSN network state; applying a first machine-learning model to the cluster to determine a TAS cycle policy that defines a timing schedule for data packet transmission in the TSN network; and providing the TAS cycle policy to components of the TSN network.

Embodiment 2. The method as recited in embodiment 1, wherein the TAS is implemented as a part of a digital twin.

Embodiment 3. The method as recited in any of embodiments 1-2, wherein the accessed plurality of data packets are simulated data packets used to train the first machine-learning model.

Embodiment 4. The method as recited in any of embodiments 1-3, wherein the accessed plurality of data packers are raw network data packets.

Embodiment 5. The method as recited in any of embodiments 1-4, wherein the first machine-learning model is a Reinforcement Learning (RL) model.

Embodiment 6. The method as recited in any of embodiments 1-5, wherein the plurality of data packets are grouped according to a second machine-learning model.

Embodiment 7. The method as recited in any of embodiments 1-6, wherein the accessed plurality of data packets are simulated data packets used to train the second machine-learning model.

Embodiment 8. The method as recited in any of embodiments 1-7, wherein the first TSN network state is one of a default network state, a congestion network state, and a new priority network state.

Embodiment 9. The method as recited in any of embodiments 1-8, wherein the plurality of data packets are a first plurality of data packets that are accessed during a first time period, the method further comprising: accessing at the TAS a second plurality of data packets during a second time period that is later than the first time period, each data packet including the data packet priority that defines an order for transmitting the second plurality of data packets by the TSN network; grouping the plurality of data packets into a second cluster according to the data packet priorities, the cluster identifying a second TSN network state that is different from the first TSN network state; applying the first machine-learning model to the second cluster to determine an updated TAS cycle policy that defines a second timing schedule based on the second TSN network state for data packet transmission in the TSN network; and providing the updated TAS cycle policy to components of the TSN network.

Embodiment 10. The method as recited in any of embodiments 1-9, wherein the data packets having a highest data packet priority are transmitted during a first time slot of the TAS cycle policy.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that are executed on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
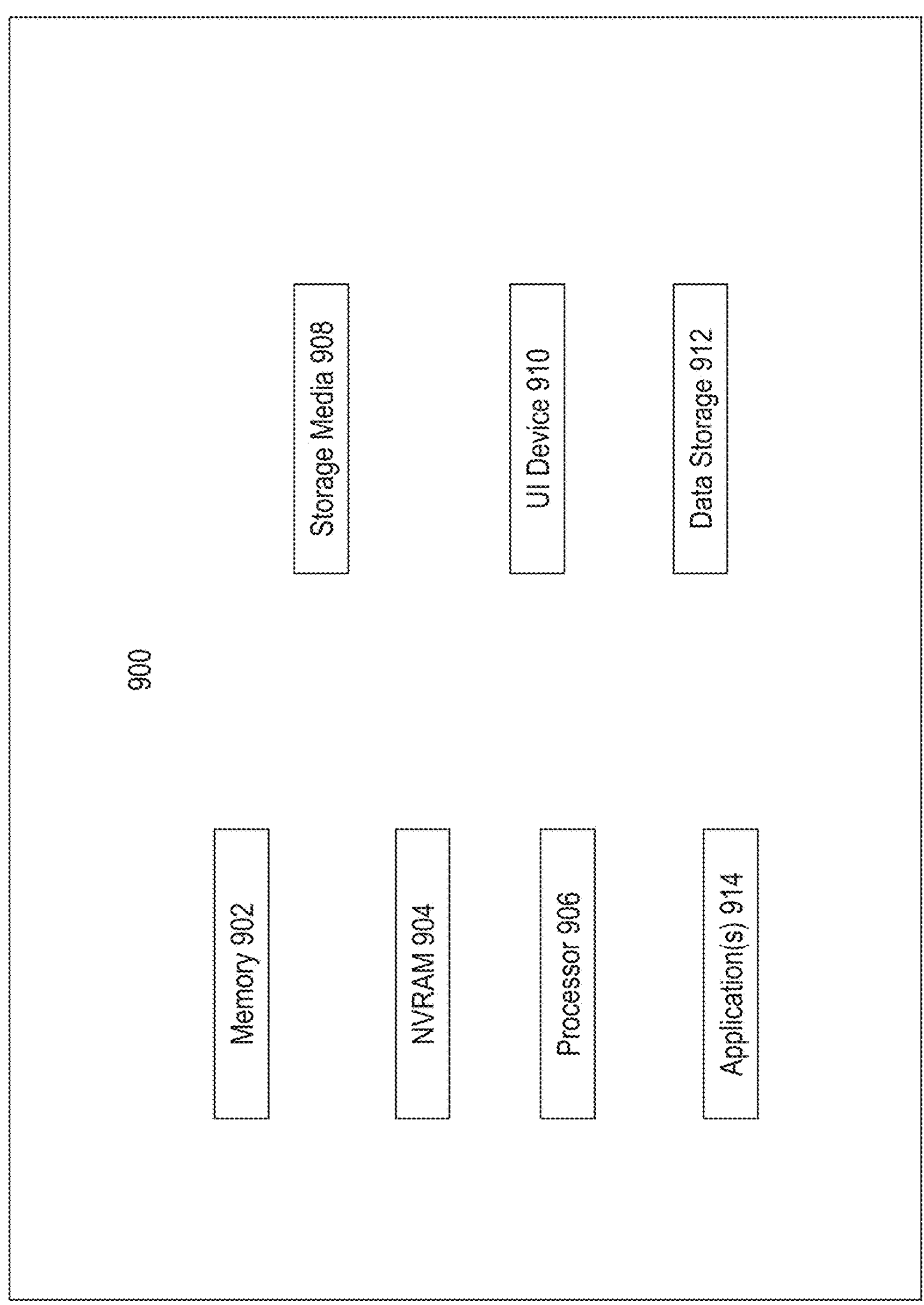
FIG. 9 discloses aspects of a computing device, system, or entity according to the embodiments disclosed herein.

With reference briefly now to FIG. 9, any one or more of the entities disclosed, or implied, by the previously described figures, and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes memory components 902 which may include one, some, or all, of random access memory (RAM), nonvolatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

accessing at a Time-Aware Scheduler (TAS) of a Time-Sensitive Networking (TSN) network a plurality of data packets, each data packet including a data packet priority that defines an order for transmitting the plurality of data packets by the TSN network;

grouping the plurality of data packets into a cluster according to the data packet priorities, the grouping being performed by a digital twin that represents the TAS and that continuously monitors network traffic to recognize a current TSN network operation state, the cluster identifying a first TSN network state;

applying a first machine-learning model to the cluster to determine a TAS cycle policy that defines a timing schedule for data packet transmission in the TSN network, wherein the first machine-learning model is selected, by the digital twin, from a plurality of reinforcement learning (RL) models that are respectively trained for different TSN network operation states including a default network state, a congestion network state, and a new priority network state; and providing the TAS cycle policy to components of the TSN network, including transmitting a configuration message from the digital twin to a physical TAS to dynamically reconfigure time slots of a TAS cycle based on the recognized TSN network operation state.

2. The method of claim 1, wherein the digital twin executes the grouping and the applying of the selected reinforcement learning model during an inference phase to generate the TAS cycle policy for the physical TAS.

3. The method of claim 1, wherein the accessed plurality of data packets are simulated data packets used to train the first machine-learning model.

4. The method of claim 1, wherein the accessed plurality of data packets are raw network data packets.

5. The method of claim 1, wherein each of the plurality of Reinforcement Learning (RL) models comprises a deep reinforcement learning model configured to output Q-value functions corresponding to alternative TAS cycle timing actions.

6. The method of claim 1, wherein the grouping of the plurality of data packets is performed by a second machine-learning model configured to classify monitored network traffic into the different TSN network operation states prior to selection of the reinforcement learning model.

7. The method according to claim 6, wherein the accessed plurality of data packets are simulated data packets used to train the second machine-learning model.

8. The method of claim 1, wherein the first TSN network state is one of a default network state, a congestion network state, and a new priority network state.

9. The method of claim 1, wherein the plurality of data packets are a first plurality of data packets that are accessed during a first time period, the method further comprising:

accessing at the TAS a second plurality of data packets during a second time period that is later than the first time period, each data packet including the data packet priority that defines an order for transmitting the second plurality of data packets by the TSN network;

grouping the plurality of data packets into a second cluster according to the data packet priorities, the cluster identifying a second TSN network state that is different from the first TSN network state;

applying the first machine-learning model to the second cluster to determine an updated TAS cycle policy that defines a second timing schedule based on the second TSN network state for data packet transmission in the TSN network; and providing the updated TAS cycle policy to components of the TSN network.

10. The method of claim 1, wherein the data packets having a highest data packet priority are transmitted during a first time slot of the TAS cycle policy.

11. A non-transitory storage medium having stored therein instructions that are executable by one or more hardware processors to perform operations comprising:

accessing at a Time-Aware Scheduler (TAS) of a Time-Sensitive Networking (TSN) network a plurality of data packets, each data packet including a data packet priority that defines an order for transmitting the plurality of data packets by the TSN network;

grouping the plurality of data packets into a cluster according to the data packet priorities, the grouping being performed by a digital twin that represents the TAS and that continuously monitors network traffic to recognize a current TSN network operation state, the cluster identifying a first TSN network state;

applying a first machine-learning model to the cluster to determine a TAS cycle policy that defines a timing schedule for data packet transmission in the TSN network, wherein the first machine-learning model is selected, by the digital twin, from a plurality of reinforcement learning (RL) models that are respectively trained for different TSN network operation states including a default network state, a congestion network state, and a new priority network state; and providing the TAS cycle policy to components of the TSN network, including transmitting a configuration message from the digital twin to a physical TAS to dynamically reconfigure time slots of a TAS cycle based on the recognized TSN network operation state.

12. The non-transitory storage medium of claim 11, wherein the digital twin executes the grouping and the applying of the selected reinforcement learning model during an inference phase to generate the TAS cycle policy for the physical TAS.

13. The non-transitory storage medium of claim 11, wherein the accessed plurality of data packets are simulated data packets used to train the first machine-learning model.

14. The non-transitory storage medium of claim 11, wherein the accessed plurality of data packets are raw network data packets.

15. The non-transitory storage medium of claim 11, wherein each of the plurality of Reinforcement Learning (RL) models comprises a deep reinforcement learning model configured to output Q-value functions corresponding to alternative TAS cycle timing actions.

16. The non-transitory storage medium of claim 11, wherein the grouping of the plurality of data packets is performed by a second machine-learning model configured to classify monitored network traffic into the different TSN network operation states prior to selection of the reinforcement learning model.

17. The non-transitory storage medium of claim 16, wherein the accessed plurality of data packets are simulated data packets used to train the second machine-learning model.

18. The non-transitory storage medium of claim 11, wherein the first TSN network state is one of a default network state, a congestion network state, and a new priority network state.

19. The non-transitory storage medium of claim 11, wherein the plurality of data packets are a first plurality of data packets that are accessed during a first time period, further operations comprising:

accessing at the TAS a second plurality of data packets during a second time period that is later than the first time period, each data packet including the data packet priority that defines an order for transmitting the second plurality of data packets by the TSN network;

grouping the plurality of data packets into a second cluster according to the data packet priorities, the cluster identifying a second TSN network state that is different from the first TSN network state;

applying the first machine-learning model to the second cluster to determine an updated TAS cycle policy that defines a second timing schedule based on the second TSN network state for data packet transmission in the TSN network; and providing the updated TAS cycle policy to components of the TSN network.

20. The non-transitory storage medium of claim 11, wherein the data packets having a highest data packet priority are transmitted during a first time slot of the TAS cycle policy.

* * * * *